United States Patent [19]

Sasaki

[11] Patent Number: 4,633,249
[45] Date of Patent: Dec. 30, 1986

[54] DISPLACEMENT DETECTOR UTILIZING CHANGE OF CAPACITANCE

[75] Inventor: Kohji Sasaki, Kawasaki, Japan

[73] Assignee: Mitutoyo Mfg. Co., Ltd., Tokyo, Japan

[21] Appl. No.: 611,869

[22] Filed: May 18, 1984

[30] Foreign Application Priority Data

May 18, 1983 [JP] Japan .................................. 58-087218
May 18, 1983 [JP] Japan .................................. 58-087219

[51] Int. Cl.$^4$ ............................................. G08C 19/10
[52] U.S. Cl. ................................ 340/870.37; 324/61 R
[58] Field of Search ........... 340/870.3, 870.25, 870.37;
324/61 R; 377/17; 318/662

[56] References Cited

U.S. PATENT DOCUMENTS 3,515,987  6/1970  Zurbrick et al. .................. 324/61 R
3,961,318  6/1976  Farrand et al. .................. 340/870.37

Primary Examiner—Jerry W. Myracle
Attorney, Agent, or Firm—Koda and Androlia

[57] ABSTRACT

A displacement detector utilizing changes of capacitance detecting the moving amount of the moving element by means of electric detection of changes in capacitance between the electrodes moving relatively. To the base of the detector is fixed a stator plate on which a plurality of transmitting electrodes are arranged at equal distances and a receiving electrode is zonally arranged in parallel with the transmitting electrodes. On the other hand, on the moving plate facing to the stator plate and slidingly established on the base, connecting electrodes are facingly installed in the spanning state over to both of the transmitting electrodes and the receiving electrode on the stator plate, and the transmitting electrodes and the receiving electrode are of electrostatic combination. The alternating current voltage having respectively different phases is applied to each of the transmitting electrodes and the phase of the output signal from the receiving electrode changes in accordance with the displacement of the moving plate. Useage of the phase changes enables the accurate detection of the displacement amount regardless of fluctuation of power voltage. The stator plate is installed the noise protective electrodes and the noise mixture into the receiving electrode from the voltage input portion can be firmly prevented.

5 Claims, 12 Drawing Figures

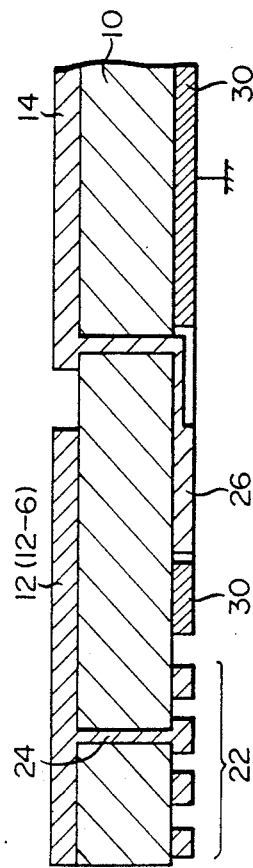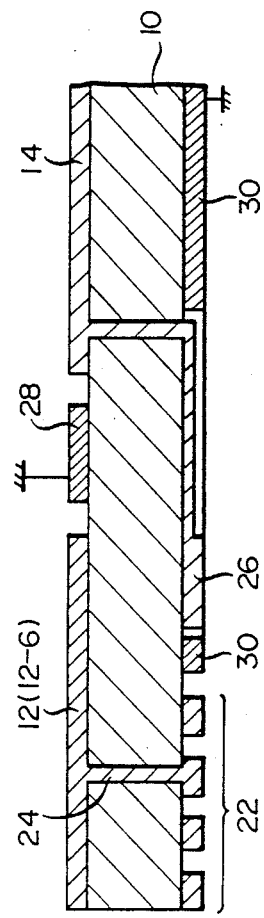

DISPLACEMENT DETECTOR UTILIZING CHANGE OF CAPACITANCE

BACKGROUND OF THE INVENTION

1. Field of The Invention

The present invention relates to a displacement detector utilizing changes of capacitance, and more particularly to a displacement detector utilizing changes of capacitance which detects a moving amount of a moving element with the basis of the changes of capacitance between both electrodes of moving moving electrodes linked with the moving element and stator electrodes fixed to the basement.

2. Description of The Prior Art

Conventionally, there is the well-known displacement detectors which electrically convert the mechanical displacement of a probe or a moving stage and detect the displacement amount. Ordinarily, this kind of apparatus includes a moving moving element movably equipped with the basement and an encoder detecting the moving amount of the moving element and converting this into electric signal pulse to output therefrom, counts the electric signal pulse output from the encoder at a counter circuit, and displays the counted value on the digital display unit in digital representation. For the encoder to be used for this kind of apparatus conventionally well-known are the photo-electric type encoder, the mechanical contact type encoder, capacitance type encoder, etc.

The photo-electric type encoder includes slits prepared on the surface of a scale or a rotor disc at an equal distance and an emitter and a receiver which form a light path through the slits of the scale or the rotor disc, and detects the displacement amount of the moving element in accordance with the displacement amount of the moving element by means of the on and off operation of the light path formed between the emitter and the receiver by the movement or the rotation of the scale or the rotor disc.

However, this photo-electric type encoder has such drawbacks that the large power consumption in the emitter increases replacing times of batteries in use and the apparatus becomes large sized in total if large capacity batteries are used. Furthermore, in order to increase the measuring accuracy it is necessary to prepare the slits on the scale or the rotor disc at a few micron interval, which causes in manufacturing problem. There is another problem that the clearance change during the apparatus in operation causes in miscount.

The mechanical contact type encoder uses slits and brush to detect the displacement amount of the moving element, and the slits and brush wear very fast. There is also another problem that noises are mixed into the measurement signal.

On the contrary, the capacitance type encoder is widely used in the detecting device of moving element in recent years since this capacitance type encoder is of no large power consumption as the photo-electric type encoder and has no slits and brush either to cause the noises in the mechanical contact type encoder.

Conventionally, in the capacitance type encoder used for the displacement detector, plural pairs of electrode plates are facingly arranged to from capacitors so that both of electrode plates can be relatively moved in accordance with the displacement amount of the moving element, and the mechanical movement amount is electrically detected as change of capacitance in the capacitors.

For example, the electrode plates are arranged on the main scale in plural numbers at an equal interval, and the other electrode plates are facingly arranged on the index scale with a certain distance from the main scale. The main scale or the index scale is slidingly moved inaccordance with displacement of the moving element in parallel with the surfaces of the plates so that the apparatus can detect the displacement amount of moving element by the capacitance of the capacitor formed by both electrode plates.

The capacitance type encoder in the prior art device uses the capacitors consisting of the moving electrode plates mentioned above to form a voltage dividing circuit and detects the displacement amount of the moving element by means of detecting voltage dividing ratio changing inaccordance with capacitance of the capacitors. Accordingly, in the prior art device, in case the distance between the surfaces of the moving electrode plates forming capacitors changes for some reason to change the capacitance of the capacitors and the power voltage applied to the voltage dividing circuit changes, the divided voltage output does not respond with the displacement amount of the moving element with accuracy and the accurate measurement cannot be performed.

In order to solve the problems of the prior art device mentioned above, such a displacement detector utilizing changes of capacitance has offered that one side electrodes of electrode pairs consisting of plural pairs are respectively applied alternating current voltage with different phases to detect voltage signal induced in the other side electrodes, and that the relative moving amount is obtained by means of detecting the phase changes of the output signal changing with the basis of the relative movement of both electrodes against the standard phase.

FIGS. 1 and 2 are illustrations showing the composition of the electrodes in the displacement detector utilizing changes of capacitance thus offered On the surface of a stator plate 10 consisting of scale plate, etc. fixed to the base, as shown in FIG. 2, a plurality of transmitting electrodes are arranged at equal distances, and a receiving electrode 14 is zonally arranged in parallel with these transmitting electrodes 12. Each of the transmitting electrodes 12 mentioned above is applied alternating current voltage signal with different phases.

A moving plate 16 is facingly arranged to the stator plate 10 and consists of a rotor linked with the moving element or a movable scale plate. On this moving plate 16 connecting electrodes 18 facingly arranged in the spanning state over to both of the transmitting electrodes 12 and the receiving electrode 14 and earth electrodes 20 facingly arranged in the spanning state over the transmitting electrodes 12 and the receiving electrode 14 are alternatively arranged along with the moving direction of the moving plate 16.

On the other hand, the voltage signal is induced in the receiving electrode 14 in accordance with the voltage signal of the respective transmitting electrodes 12 mentioned above by way of the connecting electrodes 18. Therefore, when the moving element is displaced in such state that alternative current with different phases is applied to each of the transmitting electrodes 12 mentioned above, the output signal with the phase in accordance with the displacement amount of the moving element can be obtained from the receiving electrode 14. Accordingly, the integral process of the phase in the output signal from this receiving electrode 14 by an integrator 15 and the further comparison with the predetermined standard phase enables the displacement amount of the moving element be measured with accuracy without influence of fluctuating power voltage.

In recent years, in order to increase the portable and operational capability, the apparatus has been requested to be designed in small sizes. In order to design the prior art device in small sizes, each of the electrodes must be designed in smaller area, and distance between the electrodes must be more narrow. Because of the above mentioned, the signal output voltage from the receiving electrode 14 decreases and signal to noise ratio takes decreases by noise mixture which is made from the input portion of the transmitting electrodes 12 not through the connecting electrodes 18 due to the narrow distance between the electrodes. The lowering phenomenon of signal to noise ratio makes the measuring accuracy of the device decrease.

Ordinarily, among a plurality of transmitting electrodes 12, the input terminal pattern is arranged on the reverse side of the stator plate 10 to commonly connect the mutual transmitting electrodes which the same phase alternating current voltage is applied to. The conductive paths of this input terminal pattern are plurally arranged in parallel with the arranging direction of the transmitting electrodes 12 with the basis of the respective phases.

The design of the device in small sizes makes the electrode area of the respective electrodes be smaller and the distance between the electrodes be more narrow. Because of this, the signal output voltage of the receiving electrode 14 decreases, and the noise mixture lowers signal to noise ratio.

In order to prevent such noise mixture, the device can be composed as the conductive paths of the input terminal pattern can be arranged so that the conductive paths having the inverted phase can be adjacent to each other and the noise in one conductive path can be mitigated or cancel the noise in the other conductive path.

However, since the distance between the receiving electrode and the respective conductive paths is different in the respective phases, the noise mixed from the respective conductive paths into the receiving electrode is so strong or weak that the receiving electrode cannot be completely prevented from the noise mixture even if the conductive paths having the inverted phase are adjacently arranged as mentioned above, and there still exists such a problem that the device cannot obtain the highly accurate detecting capability.

SUMMARY OF THE INVENTION

Accordingly, it is an object of the present invention to provide a displacement detector utilizing changes of capacitance which is capable of accurate detection of a displacement amount of a moving element as well as which can be designed in small sizes.

In keeping with the principles of the present invention, the object is accomplished with a displacement detector utilizing changes of capacitance which includes a stator plate fixed to the basement and a moving plate facing to the stator plate and slidingly prepared on the basement, the stator plate of which installs a plurality of transmitting electrodes to be arranged at equal distances on its surface and a receiving electrode to be zonally arranged in parallel with the transmitting electrodes, and the moving plate of which installs connecting electrodes to be facingly arranged in the spanning state over to both of the transmitting electrode and the receiving electrode in order for electrostatic combination of the both, applying the alternating current voltage having respectively different phases to each of the transmitting electrodes and detecting the displacement of the moving plate in accordance with the output signal of the receiving electrode, wherein the inprovement of said stator plate includes noise protective electrodes which prevent noise mixture into the receiving electrode from the voltage input portion.

BRIEF DESCRIPTION OF THE DRAWINGS

FIG. 6 is a sectional view taken on line A—A of FIG. 5;

DETAILED DESCRIPTION OF THE EMBODIMENTS

Figure 1:
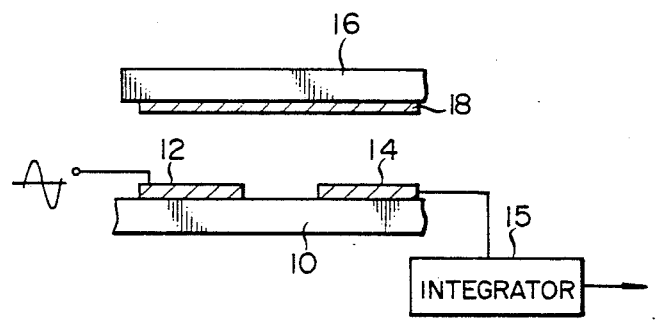
FIG. 1 is a sectional view of principal portion showing the electrode composition of a general displacement detector utilizing changes of capacitance in accordance with the teachings of the present invention.
Figure 2:
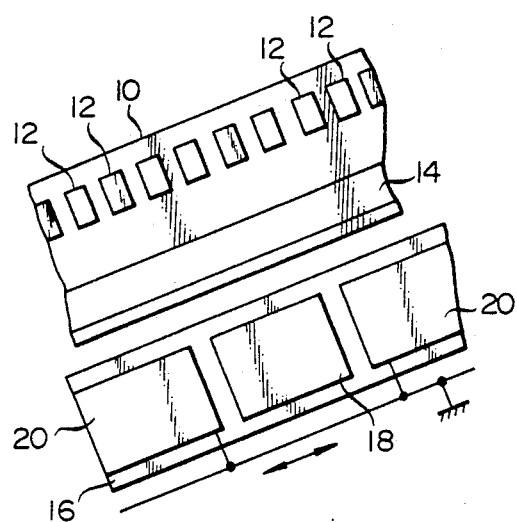
FIG. 2 is a top view describing the respective electrodes installed on a stator plate and a moving plate shown in FIG. 1.
Figure 3:
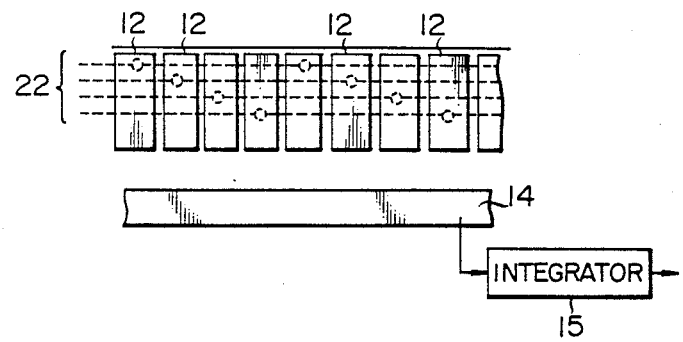
FIG. 3 is a top view of principal portion showing the input terminal pattern applying alternating current voltage to the respective transmitting electrodes.
Figure 4:
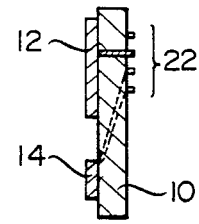
FIG. 4 is a sectional view of FIG. 3.
Figure 5:
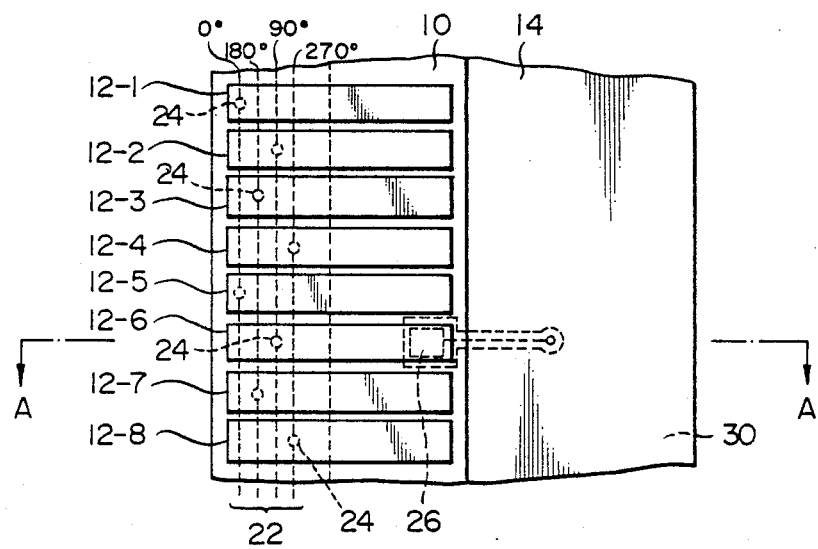
FIG. 5 is a top view showing a composition of the electrode installed on the side of the stator plate of the displacement detector utilizing changes of capacitance in accordance with the teachings of the present invention.

In FIGS. 3 through 5 shown therein is a composition of the electrodes formed on a stator of a displacement detector utilizing changes of capacitance in accordance with the teachings of the present invention. In this embodiment, such an example is taken as shown in FIGS. 3 and 4 that on the reverse side of the stator 10 prepared thereon are the input terminal pattern 22 which applies the voltage to each of transmitting electrodes 12 and an auxiliary electrode of noise protective electrode which cancels the noise. The like elements are denoted the like numerals in the prior art device, and the description will be omitted.

In this embodiment, the alternating current voltage having equal phase difference but different phases is applied one after another to each of the adjacent transmitting electrodes 12.

In FIG. 5, in this embodiment, on the position of the reverse side of the stator plate 10 corresponding to each of the transmitting electrodes 12 formed thereon is the input terminal pattern 22 which supplies the voltage of common phase to each of the common phase electrodes of the respective transmitting electrodes mentioned above 12-1 through 12-8, and this input terminal pattern and each of transmitting electrodes 12-1 through 12-8 are conductively connected by leads 24 respectively. In the device in FIG. 5, furthermore, the voltage having different phases of 0 degrees, 90 degrees, 180 degrees and 270 degrees is successively and cyclicly applied to each of the transmitting electrodes 12-1 through 12-8. At this time, a pair of opposite phase electrodes is formed between the transmitting electrode 12-5 which the signal of phase 0 degrees is input to and the transmitting electrode 12-7 which the voltage signal having the opposite phase, that is, the voltage having the phase delayed by 180 degrees, is applied to, and, in the same manner, a pair of opposite phase electrodes is formed between the transmitting electrodes 12-2 and 12-4 or between the transmitting electrodes 12-1 and 12-3.

The present invention is characterized in that the auxiliary electrode of noise protective electrode is installed on the reverse side of the stator to cancel the noise mixed from the input portion to the receiving electrode and the compensation signal from this auxiliary electrode can mitigate or cancel the noise.

In this embodiment, the auxiliary electrode 26 is prepared at the position on the reverse side of the stator 10 corresponding to one side of the transmitting electrodes forming up the respective pairs of opposite phase electrodes so that the auxiliary electrode 26 can be conductively connected with receiving electrode 14. In other words, in FIGS. 5 through 8, since the influence by noise composition becomes largest from the transmitting electrode 12-4 which is the nearest to both of the input terminal pattern 22 and the receiving electrode 14 by their positional relation, the auxiliary electrode 26 is prepared at the position of the reverse side of the transmitting electrode 12-6 which the alternating current voltage with the inverted phase is applied to against the transmitting electrode 12-4 which the alternating current voltage having the phase delayed by 270 degrees is applied to.

Consequently, the voltage signal is induced to the auxiliary electrode 26 with the same phase delay and this induced voltage signal is conductively supplied to the receiving electrode 14 so that the compensation signal from the auxiliary electrode 26 can effectively cancel the noise mixed into the receiving electrode 14 from the input portion of the other transmitting electrode in the pairs of opposite phase electrodes, that is, the transmitting electrode 12-4 to which the alternating current voltage is applied by 270 degrees.

In case the respective transmitting electrodes 12 have plural pairs of opposite phase electrodes, the requested numbers of auxiliary electrodes 26 can be installed in accordance with the amount of noise mixed into the reseiving electrode 14 from the input portion of the transmitting electrodes. When the noise amount is extremely large, it is effective to install the auxiliary electrodes respectively at the reverse surface position of one side of all the pairs of opposite phase electrodes. In this case, it is also possible to change the electrode area of the auxiliary electrode 26 into the large or small in accordance with the amount of noise.

Figure 8:
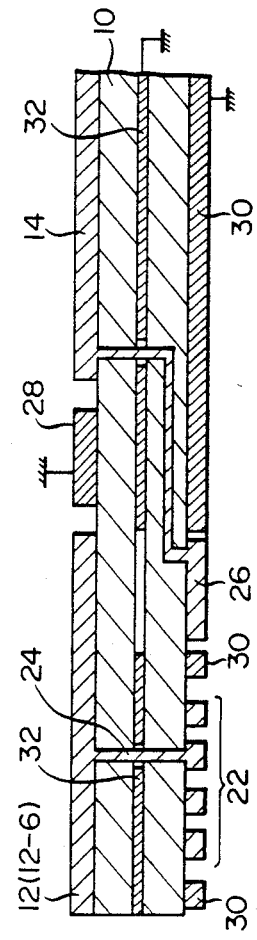
FIGS. 8 and 9 are sectional views of the other embodiments showing the compositions of the electrodes installed on the stator plate of the device in the present invention.

In this embodiment, in order to effectively delete the noise mixed into the receiving electrode 14 not through the regular route, in other words, the noise other than the voltage signal induced in the receiving electrode 14 from the transmitting electrodes 12 by way of the connecting electrodes 18, that is, the noise directly mixed into the receiving electrode 14 from the transmitting electrodes 12, insulation earth electrodes 28 are prepared between the transmitting electrodes 12 and the receiving electrode 14 as a supplementary means to electrically insulate both of them as shown in FIGS. 7 and 8.

Furthermore, as shown in FIGS. 6 through 8, an auxiliary earth electrode 30 is prepared on the outside position of the input connecting portion of the transmitting electrodes 12 on the reverse surface of the stator plate 10 to prevent from the noise mixture into the receiving electrode 14 around along the surface of the stator plate 10 from the input portion which supplies the voltage signal to the respective transmitting electrodes.

Figure 9:
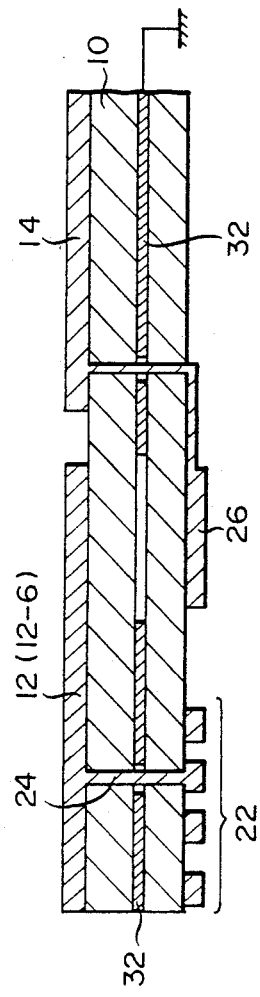

Moreover, as shown in FIGS. 8 and 9, by means of establishing an earth bed 32 for another noise protective electrode, it is also possible to prevent from the noise mixed into the receiving electrode 14 through the internal portion of the stator plate 10 from the input portions of the transmitting electrodes 12.

As mentioned above, it produces more satisfactory result on the prevention from the noise mixture into the receiving electrode 14 together with the effect of the auxiliary electrode 26, previously described, to appropriately install the isolation earth electrode 28, the auxiliary earth electrode 30 and the earth bed 32, and the moving amount of the moving element can be detected with extremely high accuracy.

An example of the device according to the present invention is given to a micrometer and will be hereinafter described.

1. Micrometer Arrangement 1-1
The moving plate is installed on a spindle and the stator on the basement.

1-2
Eight transmitting electrodes are set up as one group and five groups are arranged around the circumference of the stator at an equal distance. The respective transmitting electrodes are successively and cyclicly applied the alternating current voltage having the phases of 0 degrees, 45 degrees, 90 degrees, 135 degrees, 180 degrees, 225 degrees and 270 degrees to take eight poles driving system.

The auxiliary electrode is prepared at the position of the reverse surface of the transmitting electrode to which the alternating current voltage is applied at the inverted phase from the phase of the voltage conducted by the conductive path of the input terminal pattern which is the closest to the receiving electrode.

1-3
In this example, the electric angle changes the phase by 360°×5=1800° per one rotation of the rotor. In this example, when the device is used for a micrometer which could be read by 1 μm. at 0.5 mm. pitch, one rotation of the rotor outputs the signal of 500 pulses. In this case, the read of 1 μm. can be accomplished by means of dividing mechanical phases of 360° into 100 (360°/500÷5=360°/100).

1-4
Concrete Designed Value of The Detector Distance between The Transmitting Electrode and Connecting Electrode: under 1 mm.
Distance between The Receiving Electrode and Its Closest Conductive Path of The Input Terminal Pattern: 2 mm.

Electrode Area of One Transmitting Electrode: 6 mm².

Applied Voltage to The Transmitting Electrode: 3 V.

Distance between The Transmitting Electrode and The Auxiliary Electrode: 1 mm.

Electrode Area of The Auxiliary Electrode: 6 mm².

2. Consequence

As the auxiliary electrode is prepared to cancel the mixed noise in this example, the problem of noise mixture into the receiving electrode is effectively solved in comparison with the prior art device, described previously, which is not equipped with the auxiliary electrode.

In other words, according to the prior art device which does not have the auxiliary electrode, the noise mixed into the receiving electrode from the transmitting electrodes is about 200 mV. (signal to noise: 22 dB.), and the maximum non-linear error becomes about 3 μm. in the 1 μm reading micrometer.

On the contrary, according to this example using the auxiliary electrode, the noise mixed into the receiving electrode from the input terminal electrode decreases to 40 mV. (signal to noise: 36 dB). The maximum error at this time is 2.2 degrees and its maximum non-linear error can be 0.6 μm. to stay in the extremely small extent.

Figure 10:
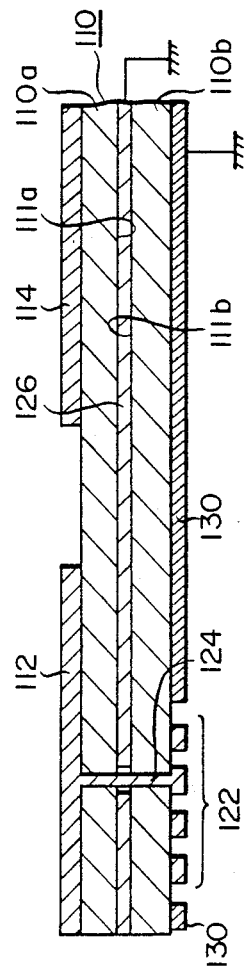
FIG. 10 is a sectional view of the principal portion showing another embodiment.
Figure 12:
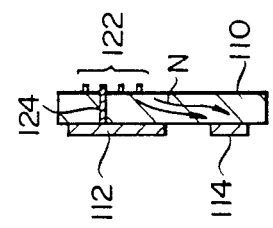
FIG. 12 is a sectional view showing the noise mixed into the receiving electrode from the voltage input portion through the inside of the stator plate.
Figure 11:
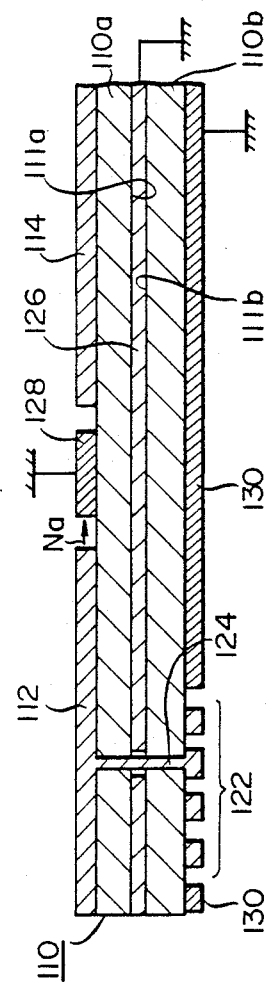
FIG. 11 is a sectional view of another embodiment of a composition of the electrodes installed on the stator plate of the device in the present invention.

FIGS. 10 through 12 show the other embodiments in accordance with the teachings of the present invention.

In the Figures, the alternating current voltage having the phases of equal difference is successively and cyclically applied to each of the transmitting electrodes 12.

These embodiments are characterized in that the earth bed for another noise protective electrode is established inside the stator plate between the receiving electrode installed on the surface of the stator plate and the voltage input portion prepared on the reverse surface of the stator plate, as shown in FIG. 12 for example, so that the receiving electrode 14 can be prevented from mixture of the noise N from the voltage input portion 22 through the interior portion of the stator plate 10.

In these embodiments, as shown in FIGS. 10 and 11, the stator plate 110 is formed with an electrode base plate 110a and an input base plate 110b. The transmitting electrode 112 and the receiving electrode 114 are prepared on the surface of the electrode base plate 110a, and on the reverse surface of the input base plate 110b formed thereon is the voltage input portion conducting the alternating current voltage to each of the transmitting electrodes 112, in other words, the input electrode pattern 122.

In these embodiments, furthermore, the earth bed 126 is established on the reverse surface side 111a of the electrode base plate 110a or on the surface side 111b of the input base plate 110b. The earth bed 126 for the noise protective electrode is formed inside the stator plate 110 between the receiving electrode 114 and the voltage input portion by means of closely adhering and fixing the reverse surface side of the electrode base plate 110a to the surface side of the input base plate 110b.

Accordingly, in these embodiments, as the receiving electrode 114 is prevented from the noise mixture from the voltage input portion through the interior portion of the stator plate 110, the displacement of the moving element can be detected with high accuracy.

In these embodiments, in order to effectively delete the noise mixed into the receiving electrode 114 not through the regular route, in other words, the noise Na other than the voltage signal induced in the receiving electrode 114 from the transmitting electrode 112 by way of the connecting electrodes 118, that is, the noise directly mixed from the transmitting electrodes 112 to the receiving electrode 114, the insulation earth electrode 128 is prepared between the transmitting electrodes 112 and the receiving electrode 114 to electrically insulate both of them as shown in FIG. 11.

Moreover, as shown in FIGS. 10 and 11, on the reverse surface of the stator plate 110 the auxiliary earth electrode 130 is established around the voltage input portion of the transmitting electrodes 112, in other words, around the input terminal pattern 122, to prevent from the noise mixture into the receiving electrode 114 around along the surface of the stator plate 110.

As mentioned above, it produces more satisfactory result on the prevention from the noise mixture into the receiving electrode 114 together with the effect of the earth bed 126 mentioned above to appropriately install the insulation earth electrode 128 and the auxiliary earth electrode 130, and the moving amount of the moving element can be detected with extremely high accuracy.

As described heretofore, according to the present invention, as the noise protective electrodes are established on the stator plate, effectively prevented is the noise mixture into the receiving electrode from the voltage input portion through which the alternating current voltage is applied to the transmitting electrodes, and, although the device can be designed in small sizes, displacement of the moving element can be detected with extremely high accuracy.

What is claimed is:

1. A displacement detector utilizing changes in capacitance comprising a base, a stator plate fixed to the base and a moving plate facing the stator plate and slidingly provided on the base, a plurality of transmitting electrodes provided on the stator plate and arranged at equal distances on its surface and a receiving electrode zonally arranged in parallel with transmitting electrodes on the stator plate, and connecting electrodes provided on the moving plate facingly arranged to span over both the transmitting electrodes and the receiving electrode, and an alternating current voltage having respectively different phases applied to and over one pair of opposite phase electrodes of the transmitting electrodes and wherein the displacement of the moving plate is determined in accordance with the output signal of the receiving electrode, the improvement comprising noise protective electrodes conductively connected with said receiving electrode on said stator plate at a position on a reverse surface of the stator plate corresponding to at least one side of the transmitting electrodes in the pairs of the opposite phase electrodes of the transmitting electrodes which mixes and cancels noise mixed into said receiving electrode from an input portion on one side of said transmitting electrodes of the pairs of opposite phase electrodes with an auxiliary signal induced by an other side of the transmitting electrodes.

2. A displacement detector utilizing changes of capacitance according to claim 1, wherein said noise protective electrodes are provided in correspondence to all of the transmitting electrodes composing the pairs of opposite phase electrodes in which the phases of the applied voltage signals are opposite to each other.

3. A displacement detector utilizing changes of capacitance according to claim 1 or 2, wherein an insulated earth electrode is provided between said transmitting electrodes and the output electrode to electrically insulate both of them.

4. A displacement detector utilizing changes in capacitance comprising a base, a stator plate fixed to the base and a moving plate facing the stator plate and slidingly provided on the base, a plurality of transmitting electrodes provided on the stator plate and arranged at equal distances on its surface and a receiving electrode zonally arranged in parallel with the transmitting electrodes on the stator plates, and connecting electrodes provided on the moving plate facingly arranged to span over both the transmitting electrodes and the receiving electrode, and an alternating current voltage having respectively different phases applied to each of the transmitting electrodes and wherein the displacement of the moving plate is detected in accordance with the output signal of the receiving electrode, the improvement comprising a voltage input portion which is conductively connected to the corresponding transmitting electrodes provided on a reverse surface of said stator plate, and noise protective electrode provided in an interior portion of said stator plate between said voltage input portion and said receiving electrode in order to prevent noise from being mixed into said receiving electrode from said voltage input portion.

5. A displacement detector utilizing changes of capacitance according to claim 4, wherein on the reverse surface side of said stator plate an auxiliary earth electrode is provided around said voltage input portion.

* * * * *